Nov. 21, 1933.  W. P. HUNT ET AL  1,935,715
GEAR MECHANISM FOR DRILLING MACHINES
Filed Dec. 4, 1931  2 Sheets-Sheet 1
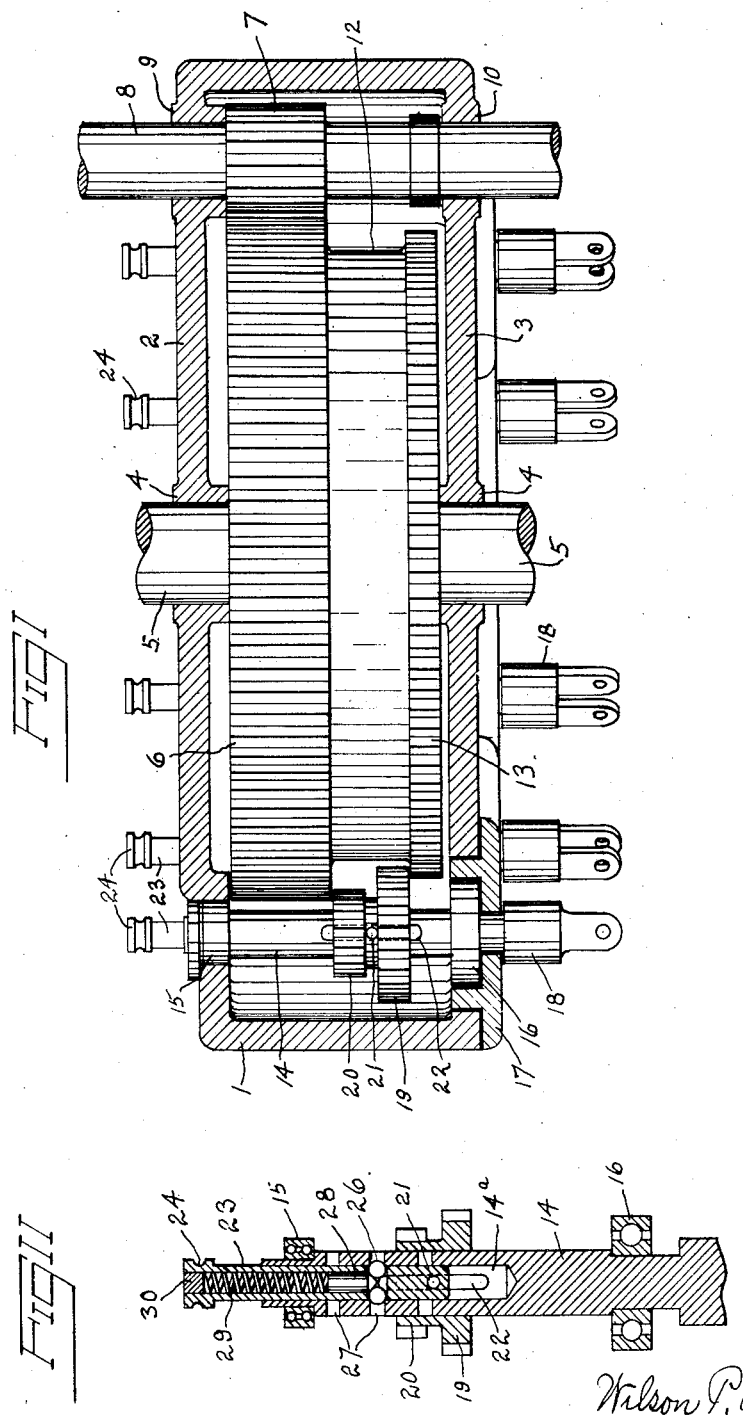
INVENTORS
Wilson P. Hunt and
BY Henry Fink,
Walter N. Haskell,
their ATTORNEY.

Nov. 21, 1933.     W. P. HUNT ET AL     1,935,715
GEAR MECHANISM FOR DRILLING MACHINES
Filed Dec. 4, 1931     2 Sheets-Sheet 2
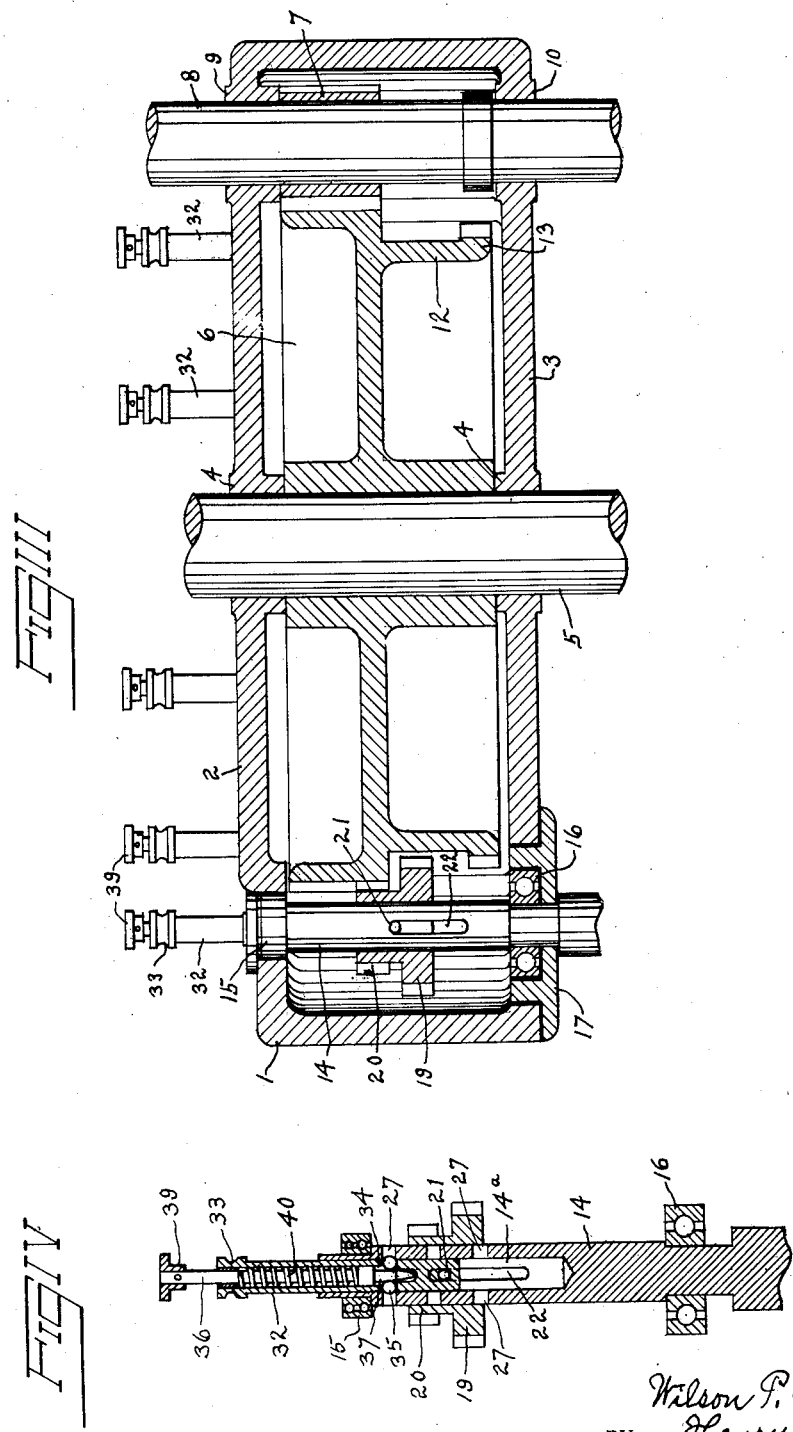

Patented Nov. 21, 1933

1,935,715

UNITED STATES PATENT OFFICE 1,935,715

GEAR MECHANISM FOR DRILLING MACHINES

Wilson P. Hunt and Henry Fink, Moline, Ill.

Application December 4, 1931. Serial No. 578,957

2 Claims. (Cl. 74—39)

Our invention has reference to a gear mechanism for drilling machines, and is similar in character to the devices set forth in an application for Letters Patent for a Multiple tool gear, filed by said Wilson P. Hunt on the sixteenth day of May, 1930, Serial No. 452,928. It includes a gear case and gearing therein for changing the speed of operation of a multiple tool organism, and has for one of its purposes to simplify such devices and reduce the same to a compact form.

There is also included in the present application a novel means for adjustment of the position of a shift-gear pinion, by means of which a change is made from one drive gear wheel to another, to vary the speed of the drills or other tools driven by the machine. Said last-named means also includes devices for holding the shift-gear in its changed position, some of which devices are capable of locking said shift-gear from movement, after an adjustment in the position thereof.

The purpose and functions of the invention will be more fully understood from the following specification, reference being had to the accompanying drawings, in which:—

Fig. 1 shows a gear casing in vertical medial section, with a set of transmission gears positioned therein, and parts embodying the invention.

Fig. 2 is a longitudinal section of the gear-shift devices employed with said mechanism.

Fig. 3 is a view similar to Fig. 1, with the gearing also in section, and a modified form of gear-shift devices in use therewith.

Fig. 4 is a longitudinal section of said modified form of gear-shift devices.

Similar reference characters indicate corresponding parts throughout the figures.

The reference number 1 indicates a multiple gear casing, having upper and lower plates 2 and 3, centrally of which are bearings 4, in which is rotatably mounted a shaft 5. Fixed to said shaft is a gear-wheel 6, actuated by a gear-pinion 7 on a main drive-shaft 8, journalled in bearings 9 and 10 in the casing. The wheel 6 is projected into a drum 12, at the lower edge of which is a gear wheel 13, of less diameter than that of the wheel 6.

The machine includes a number of tool driving mechanisms, arranged on the outer edge of the gearing, one of said mechanisms being shown at the left in Fig. 1 and in Fig. 2. Said mechanism includes a vertical shaft or spindle 14, supported at its upper end by a ball bearing outfit 15 in the upper plate of the casing 1 and at its lower end in a ball bearing organism 16 supported by a plate 17 fixed to the lower plate of the casing. Fixed to the lower ends of the shafts 14 are couplings 18 for the attachment of tools, or of other parts for connection with tools.

Slidably mounted on the shaft 14 is a gear pinion 19, adapted for engagement with the gear-wheel 13, and connected with a gear-wheel 20, of smaller diameter, and designed to mesh with the gear-wheel 6, with the wheel 19 out of mesh. The wheels 19 and 20 are caused to rotate with the shaft 14 by a pin 21 passing through the hub of said wheels and through slots 22 in the side walls of the shaft 14, in which slots said pin is vertically movable. The shaft 14 is provided with a bore 14ª, in which is movable a plunger 23, fitted at its upper end with a knob 24, and through the lower end of which plunger the pin 21 also passes. Said plunger is provided with a transverse recess 25, holding a pair of balls 26, adapted to project into one or other of pairs of openings 27 in the walls of the shaft 14, and held yieldably therein by means of a pin 28 in a bore in the upper part of the plunger and coiled spring 29 between said pin and a plug 30 in the upper end of said bore.

By moving the plunger 23 up or down the wheels 19 and 20 can be brought into engagement with their respective drive wheels, or said wheels be brought into a neutral position, as shown in Fig. 1. By using the large wheel 6 as the drive wheel for the wheel 20, and also as the driven wheel from the pinion 7, an intermediate wheel is done away with, and a more compact arrangement of the wheels made possible. The lower end of the pin 28 is conically formed, and upon force being applied to the plunger 23 to move the same, the balls are forced inwardly automatically, raising the pin a little, and permitting the movement of the balls in the bore of the shaft 14 until a new position of the parts is secured, when the balls find lodgment in another pair of openings, and are again held from accidental release by the pin 28. It will therefore be seen that to change the position of the shift-gear wheels 19 and 20 all that is necessary to be done is to grasp the upper end of the plunger and move the same upwardly or downwardly as the case may be.

In Fig. 4 is shown another form of the gear-shift devices, embracing a plunger 32, slidable in the bore of the shaft 14, and provided at its upper end with a knob 33 for operation. In a recess 34 in said plunger is a pair of balls 35 for engagement with the openings 27, and held normally in engagement with said openings by means of a pin 37 on the lower end of a rod 36, slidable in the plunger 32. The lower end of the pin 37 is tapered, and when it is desired to shift the gears the rod 36 is first pulled upwardly until the balls 35 are permitted to approach each other, and the plunger then moved in the desired direction to secure the change in the position of the gears, which have a connection with the plunger 32 similar to that hereinbefore set forth for the plunger 23. For convenience in operation the upper end of the rod 36 is fitted with a button 39, and upon being released is returned to its former position by a coiled spring 40 in the bore of the plunger and encircling the body portion of said rod. This spring also holds the rod normally in position with the balls 35 spread, and holding the shift-gearing from movement along the shaft 14.

What we claim, and desire to secure by Letters Patent, is,—

1. In a speed-change gearing, a mounting, a hollow shaft rotatable therein, a tubular plunger slidable in said shaft and projecting beyond the same at one end, a gear-shift mechanism slidable on said shaft and rotatable therewith, connections between said gear-shift mechanism and said plunger, to impart the movement of the plunger to the gear-shift mechanism, detent balls carried by said plunger and movable radially thereof, detent seats in the wall of said shaft engageable by said balls to hold said plunger and gear-shift mechanism in adjusted positions, and a spring-pressed member in said plunger in engagement with said balls, and holding the same normally in detent position.

2. In a speed-change gearing, a mounting, a hollow shaft rotatable therein, a tubular plunger slidable in said shaft and projecting beyond the same at one end, a gear-shift mechanism slidable on said shaft and rotatable therewith, connections between said gear-shift mechanism and said plunger to impart the movement of the plunger to the gear-shift mechanism, detent balls carried by said plunger and movable radially thereof, detent seats in the wall of said shaft engageable by said balls to hold said gear-shift mechanism in adjusted positions, and a spring-pressed member in said plunger in engagement with said balls and holding the same yieldably in detent position.

WILSON P. HUNT.
HENRY FINK.